Figure 1:
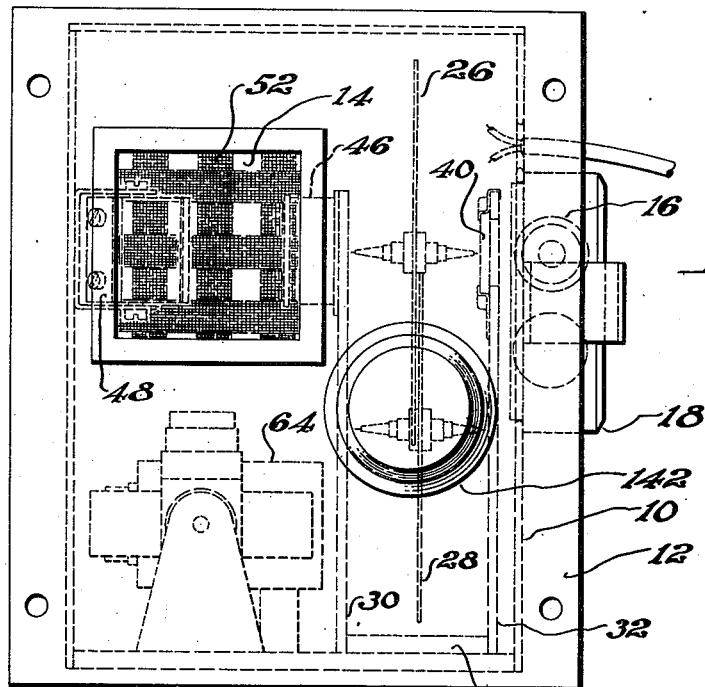

Aug. 4, 1942.   T. W. KENYON   2,291,635
MEANS FOR INDICATING TURNING MOVEMENTS OF A CRAFT
Filed July 23, 1934   3 Sheets-Sheet 1

Witness
Paul F. Bryant

Inventor
Theodore W. Kenyon
by his attorneys
Fish Hildreth Carey & Jenney

Aug. 4, 1942.　　　T. W. KENYON　　　2,291,635
MEANS FOR INDICATING TURNING MOVEMENTS OF A CRAFT
Filed July 23, 1934　　　3 Sheets-Sheet 3
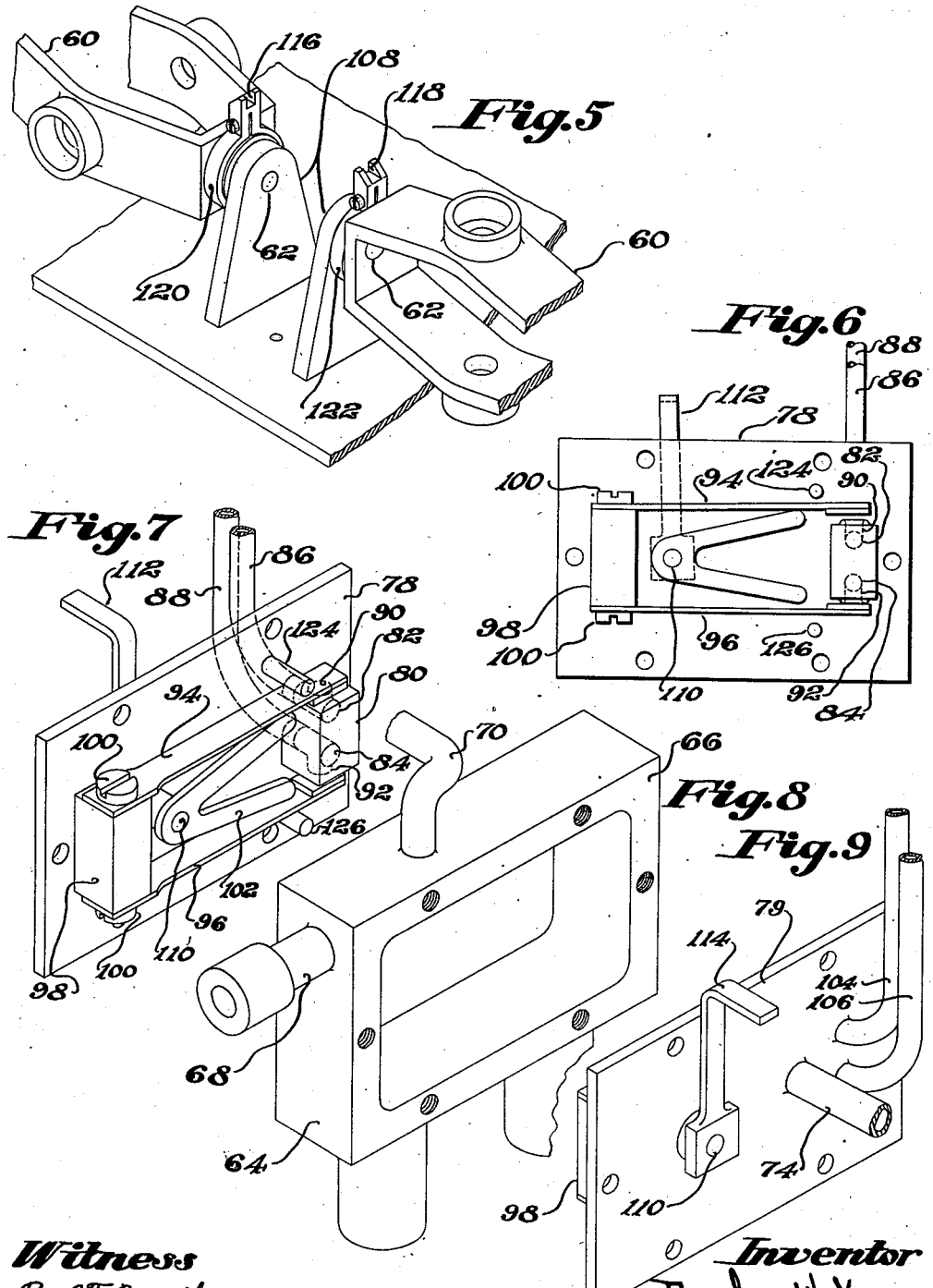
Witness
Paul F. Bryant
Inventor
Theodore W. Kenyon
by his attorneys Patented Aug. 4, 1942

2,291,635

UNITED STATES PATENT OFFICE 2,291,635

MEANS FOR INDICATING TURNING MOVEMENTS OF CRAFT

Theodore W. Kenyon, Newton, Mass., assignor, by mesne assignments, to Sperry Gyroscope Company, Inc., Brooklyn, N. Y., a corporation of New York Application July 23, 1934, Serial No. 736,565

3 Claims. (Cl. 33—204)

The present invention relates to a means for indicating the deviation or turning movement of a craft from its normal or straight-away course. In the case of aircraft the invention is intended to indicate deviation of the craft from either one of two normal planes, with consequent turning movement which may take place in a horizontal or vertical plane, or a combination of the two.

It is highly desirable that provision be made for visually indicating to the operator of an aircraft the occurrence of a turning movement, together with its extent and duration. Ordinarily deviation from a normal course of flight may be visually determined by comparison with relatively fixed objects on the ground or in the heavens. When the visibility is obscured to such an extent that all fixed objects are rendered invisible, the operator must rely entirely upon such instruments as he may have available. These instruments as a rule indicate turning movement by the displacement of a hand or similar device, gyroscopically controlled to show the existence of a turning movement. These devices are merely displaced upon inception of the turning movement, and remain in a displaced position so long as the turning movement continues. They do not create for the vision of the operator a continuous movement comparable to the movement of a stationary object with relation to which the aircraft may be travelling. Such instruments, furthermore, have serious and important disadvantages from the mechanical point of view, due to their inability to accurately indicate an abrupt turning movement, together with its cessation.

It is the purpose and object of the present invention to provide a means of visualy indicating turning movement or deviation to the operator of an aircraft in such a manner that the operator may instinctively correct the course of the craft through the same instinctive reaction which would be created by observing a fixed or stationary object with relation to the turning movement of the craft.

With this and similar equivalent objects in view, the present invention contemplates production at the face of the instrument of indicating means which is stationary during the straight-away flight of the craft, but which is instantly animated upon deviation from this straight-away course. The animation of the indicator takes the form of a movement across the face in a direction generally opposite to the direction of deviation. In the form of the invention disclosed in this application, the indicator is preferably in the form of an image which is projected upon an illuminated screen by the employment of an interrupted surface or surfaces, such as teeth or cross bars, located in the path of the light which illuminates the visible screen at the face of the instrument. Cooperating with the source of light for the purpose of producing the desired pattern or image upon the visible screen is an interrupted surface interposed in the light path and causing the source of light to project on to the screen a pattern or image comparable to the pattern of the interrupted surface. The interrupted surface may produce a pattern on the screen of regular contour and configuration which is stationary so long as the interrupted surface does not move. This interrupted surface is capable of movement across the light path to cause a corresponding movement of the image projected upon the screen, and is designed to be moved upon deviation from a normal course of flight in a direction opposite to the direction of deviation. This movement is preferably accomplished by a gyroscopic unit having a rotor driven at the necessary rate of speed to produce the necessary gyroscopic effect. Substantial deviation of the craft from its straight-away course tends to cause precession of the gyroscopic unit to compensate for the deviation. This tendency to precession is confined to small limits in either direction, but the resulting small movement of the gyroscopic unit upon inception of turning movement causes an instant movement of the interrupted surface in one or the opposite directions, depending upon the direction of precession of the gyro. This control of the surface movement I conveniently accomplish through the provision of air jets tending to impel the surface in one of two directions, and controlled in their individual intensity by the movement of precession of the gyro. As the gyro has applied thereto a load such as a spring load tending to prevent such movement, the extent of precession with a consequent variation in speed imparted to the interrupted surface serves as a measurement of the force exerted by the gyro, which in turn is a function of the rate of deviation of the craft. In this manner the rate of movement of the interrupted surface with the image projected thereby provides a measure of the rate of turn or deviation of the craft, and the distance moved is a measure of the amount of course deviation. Due to the small allowable precession of the gyro, cessation of the turning movement of the craft with the inception of a new straight-away course or restoration of the old course permits instant restoration of the gyro to its normal plane of rotation, whether this be the initial or a new plane of rotation. This is due to the fact that movements of precession of the gyro are confined to small angles, permitting prompt stabilization with an avoidance of hunting after turning movement has ceased.

In providing indication of the turning movement of an aircraft in either one of two planes normal to one another, I employ two interrupted surfaces or cross bar members movable at an angle to one another, and each controlled by an independent gyro unit so that each gyro and its controlled surface indicates deviation from a given plane. If deviation occurs in only one plane, this is manifested by the movement of a single interrupted surface. If deviation occurs simultaneously in two planes, it is manifested by the movement of two surfaces with a consequent movement imparted to the projected image, the composite movement of the image simulating the movement of the ground or a fixed object with respect to the moving craft.

In a simple and efficient form of the invention, the interrupted surfaces are provided by toothed revolving disks with the teeth overlapping and crossing one another in the light beam to produce upon the illuminated screen a pattern of regularly arranged squares, which is normally stationary but which moves across the screen in a direction determined by the movement of the disks. The disks are highly damped through the employment of electro-magnets, and upon cessation of the impelling force instantly stabilize, regardless of the movement of the instrument or the craft. The disks are extremely light in weight, and although highly damped respond instantly to the impelling force of the air when directed thereon through the precessing movement of either or both of the gyros.

With this method of indication a checkered pattern is projected upon the illuminated screen, and during the straight-away flight of the craft is maintained stationary. If the craft should initiate a turning movement to the left in a horizontal plane, the pattern instantly moves to the right transversely across the screen, the rate of this movement corresponding approximately to the rate of deviation of the craft from its normal course. In a like manner, if the craft initiates an upward turning movement in a vertical plane, the normally stationary image moves downwardly across the screen at a similar rate. A turning movement representing a deviation from both planes causes a like composite movement of the image, which may move angularly across the screen in a direction opposite to that of the turning movement. The creation of this image with its similarity in movement to that of the ground makes the control of the operator for the restoration of the straight-away course entirely instinctive. The continuous indication of the rate of deviation instinctively creates in the mind of the operator the appropriate reaction to correct deviation, with accompanying assurance that the movement of the craft shall not become uncontrollable. The instant arrest of image movement upon cessation of turn likewise contributes to controllability.

It will be evident to those skilled in the art that the exact method of providing and operating the interrupted surfaces, together with the method of projecting the pattern created by these surfaces, may be subject to modification without departing from the spirit of the invention. In a like manner, the construction and method of driving the gyro units, together with the means for controlling movement of the interrupted surfaces through precession of these units may be the subject of further modification, provided that these surfaces are caused to reflect in their movement the force exerted by the gyro due to the turning movement of the craft.

Figure 2:
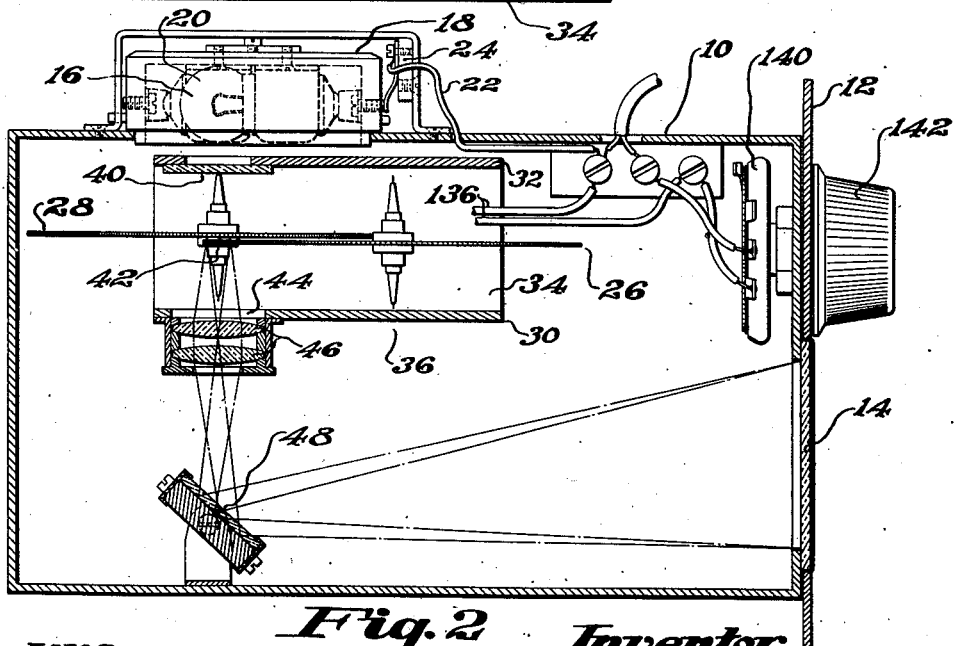
Figure 3:
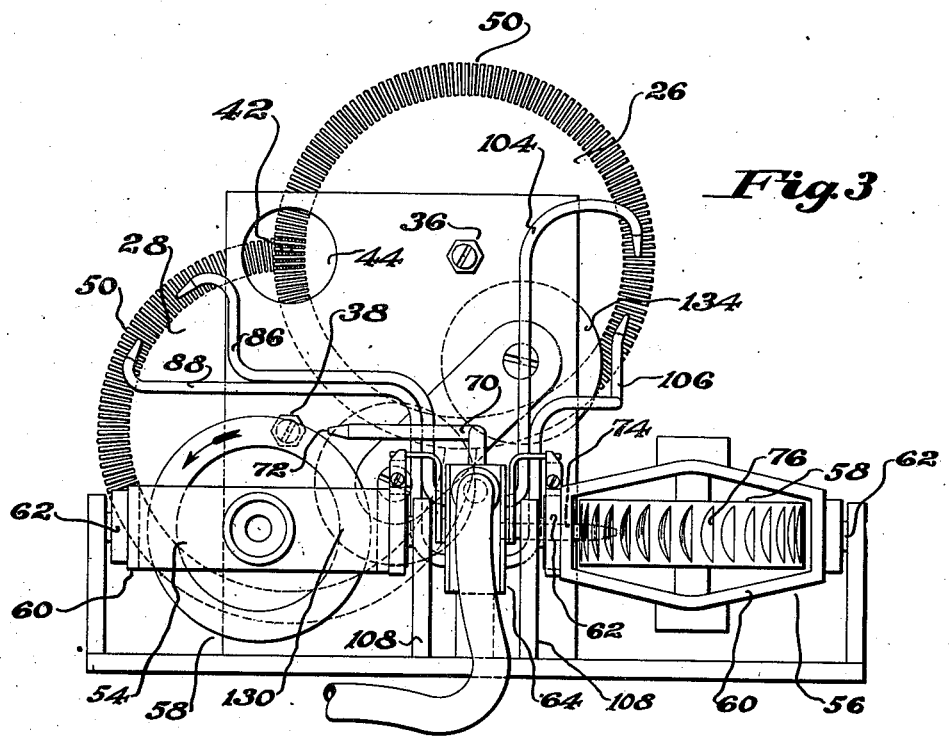
Figure 4:
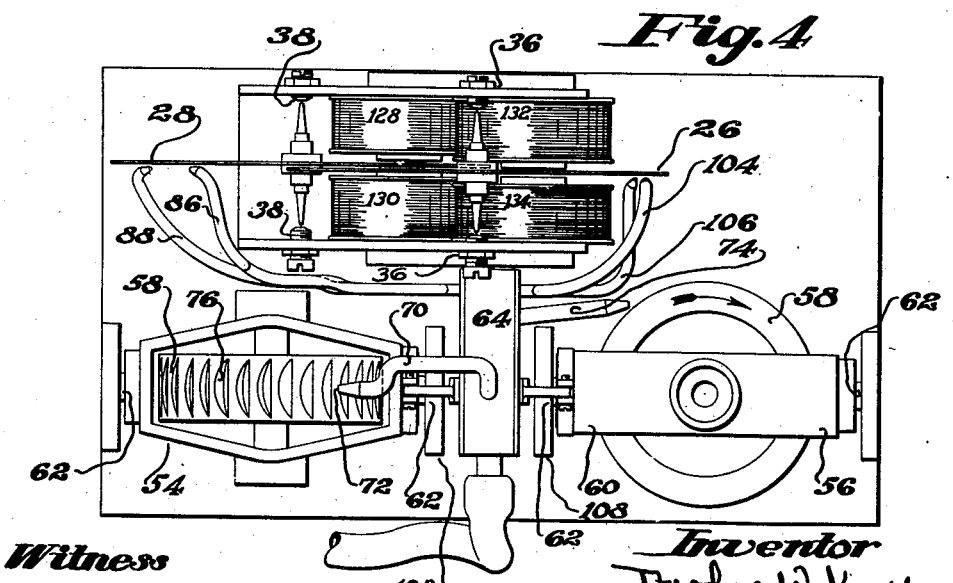

Referring to the illustrated embodiment of the invention Fig. 1 shows a front elevation of an instrument designed to carry out the present invention; Fig. 2 is a plan view partly in section of the instrument shown in Fig. 1; Fig. 3 is a side elevation of the interrupted scanning surfaces and directing gyros removed from the enclosing housing; Fig. 4 is a top plan view of the parts shown in Fig. 3; and Figs. 5 to 9, inclusive, are details illustrating the method of controlling movement of the disks through precessing movement of the gyro.

Referring particularly to the illustrated embodiment of the invention, the instrument is enclosed in a housing 10, having a front plate 12 provided with a ground glass screen 14 of sufficient size to be plainly visible to the operator. As will be evident, the instrument is located in a predetermined position with respect to the craft, and in the case of an aeroplane preferably on the instrument board where it may be readily observed by the pilot. The screen is illuminated through light emitted from a bulb 16 which is enclosed within a cap 18 secured to the side of the housing 10. This bulb may be located within the cap, and is indicated in dotted lines at 20. The bulb is energized through leads 22 connected to a terminal base 24. The interrupted surfaces are provided by disks 26 and 28, which are supported for rotation between the opposite walls 30 and 32 of a separate U-shaped support 34. The disks, as will be more particularly evident from an inspection of Fig. 3, are journaled at 36 and 38 in such a manner that the peripheral margins at the region of intersection are travelling generally at right angles. The light beam emanated from the bulb 16 is directed through a transparent window 40 provided in the wall 32 opposite the beam of light. The light beam after passing through the window passes through the region of intersection of the disks indicated at 42, and thence through an opening 44 formed in the opposite wall 30. The beam may be condensed by lenses 46, and directed against a reflecting mirror 48, which in turn projects the beam upon the translucent screen 14. The disks 26 and 28 are provided with uniform teeth 50 upon the peripheries, which throughout the region of intersection 42 interrupt the light beam in a checkered pattern somewhat similar to that shown at 52 in Fig. 1. Obviously, with no movement of the disks this pattern is stabilized and stationary with respect to the screen. Upon movement of the disks, however, the pattern becomes animated and moves in a direction and at a rate comparable to that of the disks. The disks are extremely light in weight, and are mounted in bearings designed to afford little or no frictional resistance to rotative movement. The disks are also located in close proximity to one another with a minimum of clearance between their opposed surfaces.

Movement is imparted independently to each of the disks by an impelling force controlled through a gyro unit. There are two of these gyro units, indicated respectively at 54 and 56, as shown particularly in Figs. 3 and 4. Each of these units comprises a rotor 58 journaled for rotation in a frame 60, supported at opposite ends in swivel bearings 62. The gyro units are supported for rotation in planes normal to one another in order that each gyro by its tendency to precess will indicate deviation from a different plane. This tendency to precession of the gyros upon deviation or turning movement of the craft is utilized to control and operate the interrupted surfaces. To this end a valve chest 64 is located between the gyros and is controlled by both gyros. This valve chest and the cooperating connections with the gyros is indicated more particularly in Figs. 5 to 9, inclusive. It comprises a rectangular rim portion 66, which when enclosed at opposite sides provides a closed chamber for the reception of air pressure introduced at 68. This air pressure (which may be either positive or negative) may be generated from without the instrument in any suitable manner (not indicated). The air pressure constantly maintained within the chamber is utilized to operate the gyro rotors at the necessary high rate of speed through a delivery pipe 70 terminating in an air jet 72, a delivery pipe 74 terminating in a similar air jet, each jet cooperating with the toothed periphery 76 upon the rotor rim to continuously drive the rotor during the operation of the apparatus. The delivery pipe 68 and the means for supplying this pipe are intended to provide a constant and ample supply of air under pressure to drive the gyro rotors and in addition the interrupted surfaces.

The member 66 is closed at opposite sides by side plates 78 and 79, each of which has mounted thereon an independent system of control valves and operating connections therefor. Referring particularly to Fig. 7 which illustrates the plate 78 with its associated mechanism, it will be observed that a block 80 is provided with separate chambers 82 and 84, each of which is in communication with an air line 86 and 88, respectively. Each of these chambers is also provided with openings indicated at 90 and 92, extending respectively to the top and bottom of the valve block. These openings are normally closed by spring closures 94 and 96, each of which is fixed at its opposite end to a support 98 through fastening screws 100. Positioned between the spring members is a valve actuator 102 of generally V-shaped form having two arms intended to engage and raise the closures 94 and 96 from their respective seats on movement in either direction. It will be evident that a slight tilting movement of the actuator in one direction tends to open communication with the interior of the pressure chamber, and thus cause a flow of air through the corresponding air pipe. For example, elevation of the spring closure 94 a slight amount will connect the air pipe 86 with the interior of the pressure chamber and deliver air therethrough.

The air pipes 86 and 88, as indicated, terminate in jets directed oppositely against the toothed portion of the disk 28. Obviously, elevation of the closure 94 with the consequent flow of air through the pipe 86 will cause rotation of the disk 28 in a direction determined by the issuing jet. A slight movement of the actuator arm causes initial slow movement of the disk due to the limited communication with the pressure chamber, whereas increased movement to a full open position accelerates rotation of the disk correspondingly. In consequence the rate of turning movement of the disk is dependent upon the force which is exerted to lift the spring 94 and in a like manner the spring 96.

The companion plate 79 carries a similar and identical valve mechanism which controls two air lines 104 and 106, which terminate in oppositely directed jets, projecting air upon the toothed periphery 26, all as shown clearly in Figs. 3 and 4.

This valve assembly, as shown generally in Fig. 4, is located between the gyro units, each of which is mounted at their inner ends upon supports 108. Each actuator member 102 is pivoted upon a rock shaft 110 extending through the side wall and having connected at its outer end a bent operating lever shown at 112 on the wall 78, and at 114 on the wall 79. The bent outer portions of these levers are designed for reception in slots 116 and 118 formed respectively in collars 120 and 122, clamped to the hubs of the gyro frames 60, and designed to turn therewith upon attempted movements of precession of the gyro unit (see Fig. 5). These movements are limited to small amounts in either direction by the restoring springs 94 and 96. In the event of an abrupt turning movement of sufficient force to overcome the restoring spring, movements are positively limited by upper and lower stop pins 124 and 126, projecting from the side walls, as indicated in Fig. 7. The springs resist tendency to precess upon the part of the gyro units, and the stop pins limit and confine this movement of precession to relatively small angles which may approximate 3° to 5° of movement in each direction.

By virtue of this construction the gyro units are so confined that they immediately stabilize upon restoration of a straight-away course, and the movement of the interrupted disks is actually reflecting the force exerted by the gyros against the resisting valve springs. As this force increases additional opening of the valve or valves imparts increased speed to the disks in reflection of the increased rate of turn. This speed continues so long as the turn continues at this rate, and decreases with decrease in the rate of turn. The composite of the movement of the two disks also partakes of variations in the rate of speed.

The light disks instantaneously rotate in either direction, determined by the delivery of the air jet thereon. Upon cessation of this jet, however, due to closure of the valves and restoration of normal flight, movement of the disks is instantly resisted through the use of adequate damping devices. As indicated particularly in Figs. 3 and 4, the disk 28 is damped by oppositely disposed electromagnets 128 and 130, and the disk 26 is damped by similarly located electro-magnets 132 and 134. These magnets are connected with a suitable source of electrical energy through leads 136, the actual connection of the leads with the magnet windings not being shown for purposes of simplicity. The damping force exerted by the magnets may be varied through a variable resistance indicated at 140, controlled through a knob 142 rotatably mounted on the front plate.

The provision of the light running but heavily damped disks serves to cause instantaneous response to movements of the gyro units, with an equally prompt cessation of movement upon restoration of the units. Furthermore, the damping is sufficient to prevent accidental or sporadic movement of the uits due to vibration or jarring communicated from the moving craft.

The construction as above described actually produces an image which reflects in its rate of movement the force exerted by the gyro units. In consequence, the rate of movement of this image is truly representative of the rate of turn of the craft, and continues to be so representative so long as the turning movement continues. Observation of this moving image on the part of the pilot or operator communicates at all times the progress of the craft without the necessity for reference to external objects. This accurate picture of the craft motion visually conveyed to the pilot makes instinctive the acts necessary to correct the turn whenever desired.

The rotating disks are so designed in conjunction with the air jets that their rate of rotation at no time is sufficiently high as to blur the image projected upon the screen. At all times the observer is able to see the pattern of squares created by the intersecting teeth, and to observe the motion of this pattern without blurring or distortion. In other words, the observer visually sees a restricted portion of the moving surfaces, and not merely an effect created by surfaces rotating at too high a rate of speed to be directly visualized.

It will be obvious to those skilled in the art that the instrument may be mounted with the front portion shown in Fig. 1 at the instrument board extending athwart the axis of the craft, and with the length of the instrument as indicated in Fig. 2 coinciding substantially with the longitudinal axis of the craft. In this position the gyro units are properly located to accomplish their desired function.

What is claimed is:

1. An instrument of the class described comprising a gyroscopic unit confined for movement of precession in a plane, an indicator in the form of alternate light and opaque parallel bars visible to the operator, a fluid-operated motor for moving the indicator, fluid ports, and valve means differentially controlled by precession of the gyroscopic unit for continuously operating the motor during precession at a variable rate determined by the amount of precession and in a direction dependent on the direction of precession.

2. The combination with a turn indicator type gyroscope, of means for converting the rate of turn responsive precession thereof into course deviation indications, comprising intake ports adjacent thereto, spring arm closures normally closing both of the same, said closures being differentially opened upon precession of the gyroscope in one or the other direction, a reversible fluid motor connected to said ports, and an indicator driven thereby.

3. The combination with a turn indicator type gyroscope, of means for converting the rate of turn responsive precession thereof into course deviation indications, a pair of leaf springs, a member between said springs connected to said gyroscope whereby said springs oppose precession of said gyroscope in either direction, a valve on each spring, ports normally closed by said valves when the gyroscope is centralized but differentially opened on precession of said gyroscope in one or the other direction a reversible fluid motor connected to said ports, and an indicator driven thereby.

THEODORE W. KENYON.